US005273427A

United States Patent [19]

Austin, Jr. et al.

[11] Patent Number: 5,273,427

[45] Date of Patent: Dec. 28, 1993

[54] INSTRUMENT HOLDER WITH VALVE ASSEMBLY

[75] Inventors: George K. Austin, Jr.; Pierre LaPlante; Larry D. Osterhoudt, all of Newberg, Oreg.

[73] Assignee: A-Dec, Inc., Newberg, Oreg.

[21] Appl. No.: 860,986

[22] Filed: Mar. 31, 1992

[51] Int. Cl.[5] .................. A61C 1/02

[52] U.S. Cl. .................. 433/28; 137/884

[58] Field of Search .................. 433/28, 98; 137/884

[56] References Cited

U.S. PATENT DOCUMENTS

| | | | |
|---|---|---|---|
| Re. 28,649 | 12/1975 | Austin, Jr. | 433/78 |
| D. 243,188 | 1/1977 | Meyer | D24/1 B |
| D. 328,791 | 8/1992 | Nordstrom et al. | D24/177 |
| 2,696,669 | 12/1954 | Ikse | 433/85 |
| 3,511,235 | 5/1970 | Stram | 128/200.19 |
| 3,638,310 | 2/1972 | Austin, Jr. | 433/28 |
| 3,653,125 | 4/1972 | Heubeck | 433/98 |
| 3,672,059 | 6/1972 | Booth | 433/28 |
| 3,718,974 | 3/1973 | Buchtel et al. | 433/28 |
| 3,756,284 | 9/1973 | Breunich | 137/636 |
| 3,918,161 | 11/1975 | Morgan et al. | 433/28 |
| 4,094,069 | 6/1978 | Cope | 433/28 |
| 4,151,647 | 5/1979 | Saupe et al. | 433/28 |
| 4,165,546 | 8/1979 | Philipson et al. | 4/262 |
| 4,173,827 | 11/1979 | Austin, Jr. | 433/98 |
| 4,188,976 | 2/1980 | Austin, Jr. | 137/637.1 |
| 4,230,143 | 10/1980 | Dettmann et al. | 137/270 |
| 4,251,211 | 2/1981 | Plowman et al. | 433/98 |
| 4,307,475 | 12/1981 | Schmidt | 4/263 |
| 4,459,106 | 7/1984 | Peralta et al. | 433/28 |
| 4,526,197 | 7/1985 | Martin et al. | 137/596.2 |
| 4,676,750 | 6/1987 | Mason | 433/101 |
| 4,806,099 | 2/1989 | Peralta | 433/28 |
| 4,883,316 | 11/1989 | Austin, Jr. et al. | 297/191 |
| 4,952,146 | 8/1990 | Doty | 433/77 |

OTHER PUBLICATIONS

A-Dec 117-page equipment catalog, cover and p. 73, Jan. 1991.

Robin Dental Company 40-pg. catalog, cover and p. 23, Feb. 1985.

Marus Dental Equipment 40-page catalog, cover and p. 30, Mar. 1982.

Planmeca Oy one-page "PM 2002 EC" brochure, circa Jan. 1991.

*Primary Examiner*—John J. Wilson

*Attorney, Agent, or Firm*—Klarquist Sparkman Campbell Leigh & Whinston

[57] ABSTRACT

A dental instrument holder is combined with a compact valve assembly that is operable for conveying signals to a control system whenever and instrument is removed from or returned to the holder.

10 Claims, 5 Drawing Sheets

INSTRUMENT HOLDER WITH VALVE ASSEMBLY

TECHNICAL FIELD

The present invention is directed to a dental instrument holder that includes a valve assembly that is mounted to the holder and operable for generating control signals when an instrument is removed from and returned to the holder.

BACKGROUND AND SUMMARY OF THE INVENTION

Dental instruments, such as pneumatically driven drills, are normally held by an instrument holder within reach of the dentist. In the past, valve mechanisms have been mounted to the instrument holder for generating and conveying signals to a control system whenever the instrument was removed from and returned to the holder.

FIG. 1 depicts in exemplary prior art instrument holder 20, shown in dashed lines, along with its associated valve mechanism 22, generally shown in solid lines. The instrument holder 20 is shaped to define an opening 24 into which a hand instrument, such as a pneumatically driven drill, can be inserted. The opening 24 is tapered so that as the instrument is lowered within the opening 24, the instrument will contact the walls of the opening and be suspended therefrom until removed by the dentist.

The valve mechanism 22 is mounted inside the instrument holder 20 and is operable for opening and closing a pneumatic valve 26 in response to the respective removal and return of the instrument to the opening 24. This two-state valve 26 is connected via a low-pressure pneumatic line 28 to a control system. Opening or closing of the valve 26 effectively changes the pressure in the line 28, and the control system responds to changes in the pressure by, for example, applying or removing a relatively high air pressure source to the pneumatically driven instrument.

The valve 26 depicted in FIG. 1 includes a generally hollow, cylindrical body 30 to which the pneumatic line 28 is connected to deliver pressurized air to the interior of the body. A valve stem 32 protrudes through an opening 34 in the valve body 30. The base of the stem 32 is enlarged to seal against the opening 34. An internal spring normally forces the valve stem base against the opening 34 with the stem 32 extending along an axis concentric with that opening 34 thereby to close the opening. Whenever the stem 32 is tipped out of the closed position, such as shown in FIG. 1, the base of the valve stem shifts against the opening to let air bleed from the valve body and, hence, from pneumatic line 28. The opening of the valve is thus communicated to the control system by the pressure drop in line 28.

The valve mechanism 22 of the depicted prior device includes a trigger 40 that is pivotally mounted to a pivot tube 42 that is fastened inside the instrument holder 20. A compression spring 44 is mounted between the trigger 40 and the instrument holder for normally urging the tip 46 of the trigger through a slot in the instrument holder so that the tip 46 projects into the opening 24.

The valve body 30 is mounted inside a casing 50 near the trigger 40. A generally tubular extension 52 of the trigger 40 fits over the pivot tube 42 to extend from the trigger to a location next to the protruding stem 32 of the valve 26. The extension 52 includes a projecting boss 54 that is configured and arranged so that when the trigger tip 46 is forced by the spring 44 into the unoccupied opening 24, the boss 54 bears against the stem 32 to tip that stem into the open position as shown in FIG. 1.

Whenever an instrument is placed into the opening 24, the instrument contacts the tip 46 of the trigger, thereby pushing the tip into the instrument holder, compressing the spring 44 and, rotating the boss 54 about tube 42 away from the stem 32 so that the stem resumes the position for closing the valve 26. The closing of the valve is communicated to the control system by the consequent pressure increase in line 28.

The present invention is directed to an instrument holder with valve assembly that is considerably more compact and easier to assemble than the prior art holder and valve mechanisms. The valve assembly is essentially a self-contained unit that is easy to install into the holder. The holder construction is greatly simplified as a result of the self-contained nature of the valve assembly. The valve assembly is adaptable for any of a number of other applications where a two-state, pneumatic control signal may be desired.

The instrument holder into which the valve assembly is mounted is a compact, easily cleaned member. In one embodiment of the instrument holder, multiple openings are formed for holding instruments. At the selection of the user, the openings may or may not carry the associated valve assemblies. A plug is provided for simplifying cleaning of any holder opening that does not have an associated valve assembly.

DETAILED DESCRIPTION OF THE PREFERRED EMBODIMENT

Figure 1:
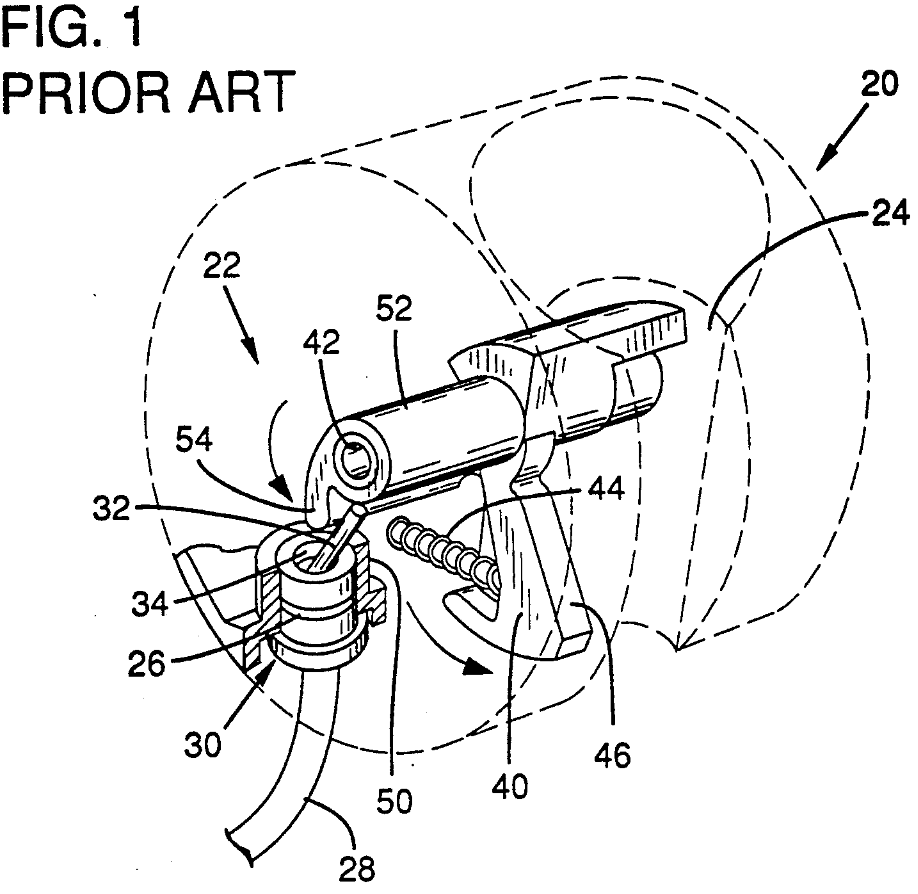
FIG. 1 PRIOR ART
FIG. 1 is a perspective view of a prior art instrument holder with an associated valve mechanism.
Figure 2:
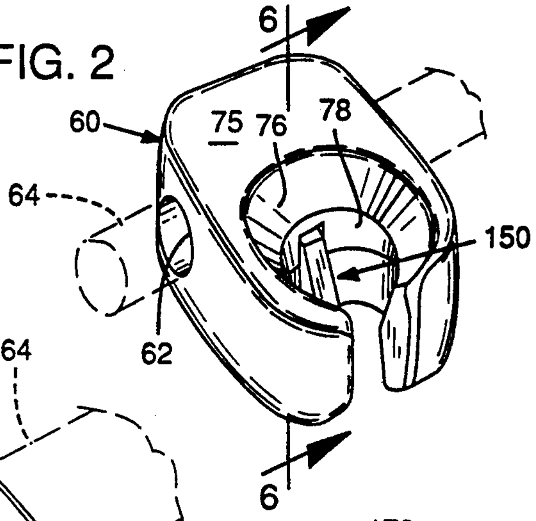
FIG. 2 is a perspective view of a preferred embodiment of an instrument holder with valve assembly.

FIGS. 2-6 depict the invention embodied in a instrument holder that is configured for holding a single instrument and carrying a single valve assembly. The instrument holder 60 is, preferably, a unitary compression-molded part made of a suitable material, such as phenolic melamine. A mounting hole 62 is formed laterally through the holder 60 to permit the holder to be slid over a support rod 64, such as shown in dashed lines in FIGS. 2 and 3, that is located in the vicinity of the dentist. When the desired orientation of the holder 60 is established, a set screw 66 (FIG. 6) is tightened against the rod to keep the holder in place relative to the rod.

The holder 60 includes two forwardly projecting, opposed fingers 70 that are arranged, as viewed from above, to define a generally C-shaped configuration. The interior space between the opposed fingers 70 is the opening 72 into which a hand instrument, such as shown at 74 in FIG. 6, is inserted and held by the holder 60.

At the junction of the opening 72 and the top surface 75 of the holder, the holder 60 is shaped to define an inclined upper surface portion 76 of the opening. That surface 76 is inclined downwardly in the direction of the opening so that an instrument that is lowered into the holder slightly off center of the opening 72 will be directed by the surface 76 toward the center of the opening 72.

The lower surface 78 portion of the opening 72 is shaped to define a generally diminishing size of the opening in the direction toward the bottom of the holder 60. From a location about the midpoint of the lower surface 78, however, the size of the opening 72 is generally constant to the bottom surface 77 of the holder 60.

Figure 3:
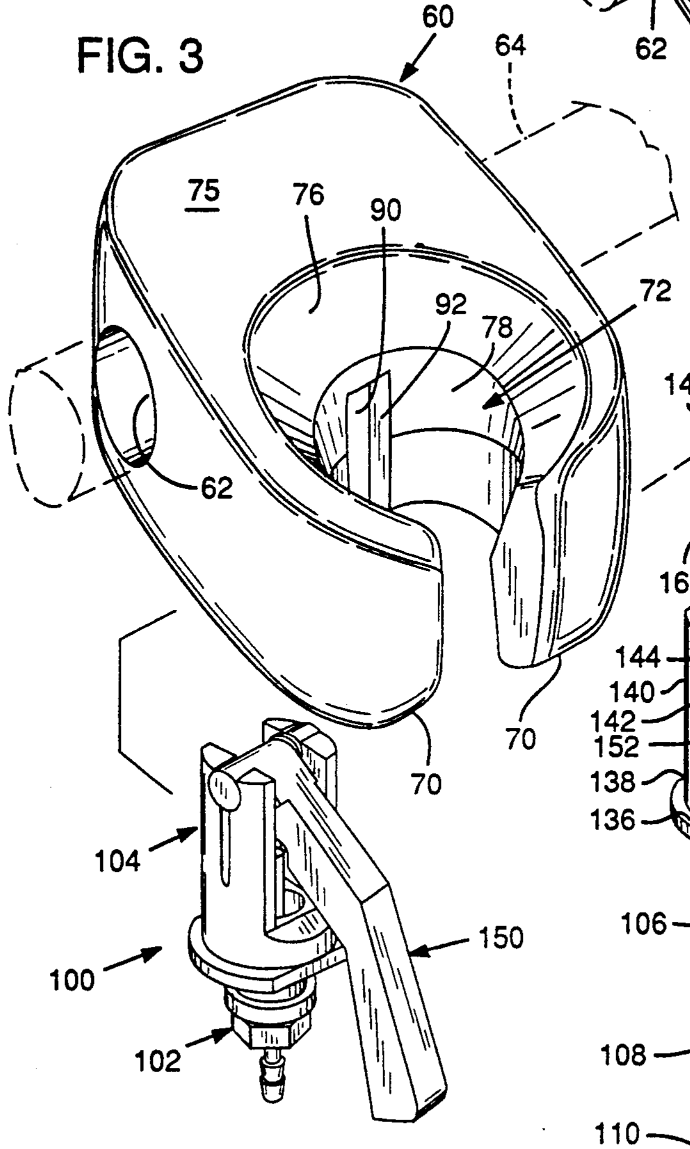
FIG. 3 is an exploded perspective view showing the instrument holder and valve assembly.
Figure 5:
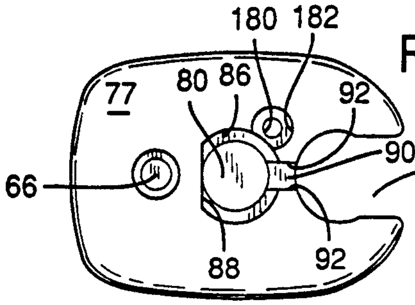
FIG. 5 is a bottom view of the instrument holder without an installed valve assembly.
Figure 6:
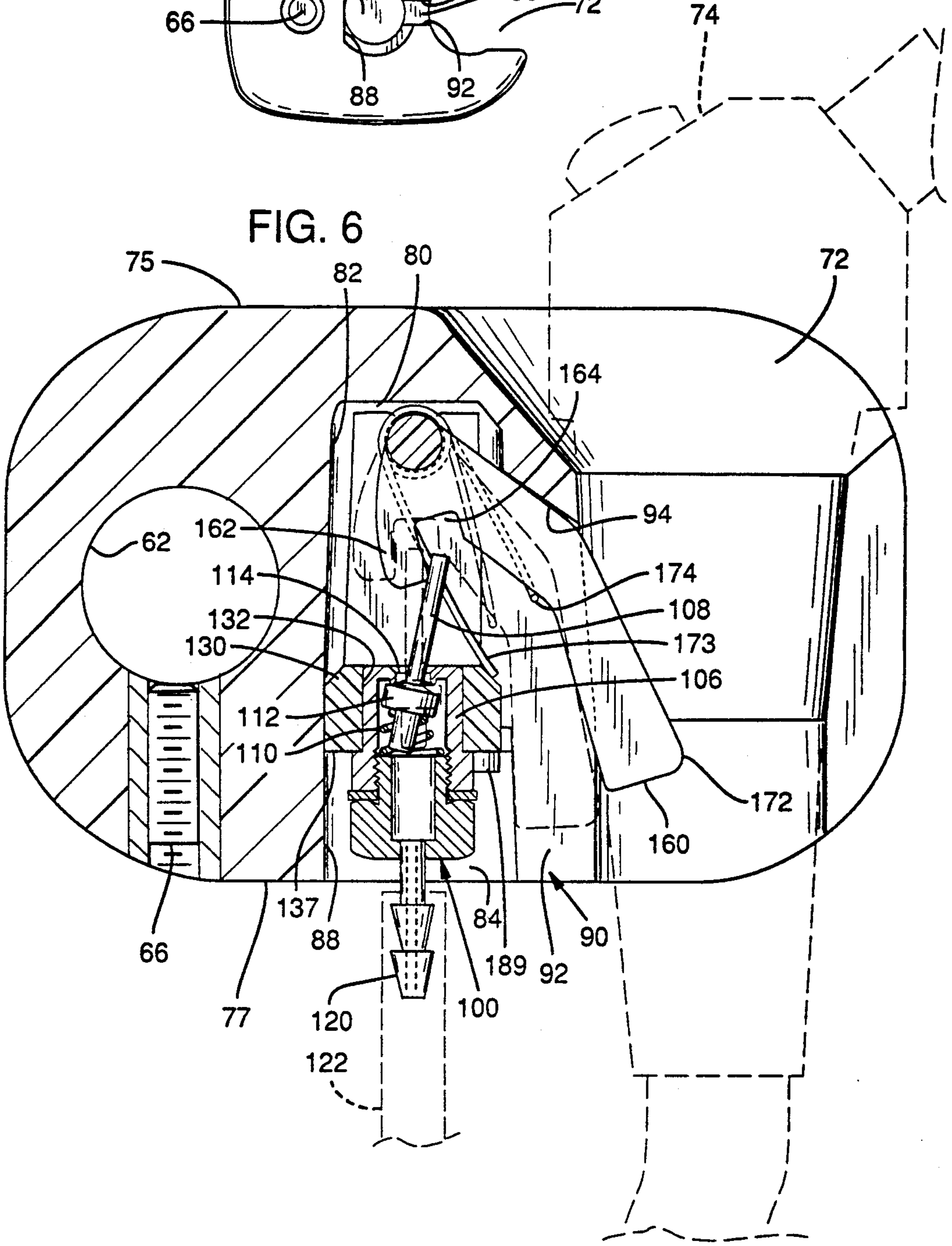
FIG. 6 is a cross sectional view taken along line 6—6 of FIG. 2.

With particular reference to FIGS. 3, 5 and 6, the holder 60 has formed in it a central cavity 80 that extends from the bottom surface 77 to a location near the top of the holder 60. Approximately the upper two-thirds of the cavity 80 defines an inner section 82 that has a generally cylindrical shape. Between the inner section 82 and the bottom surface 77 of the holder 60 there is defined an outer section 84 of the cavity 80 that has a diameter slightly greater than the inner section 82, thereby defining a substantially annular shoulder 86 (FIG. 5) within the cavity. Preferably, the portion of the cavity outer section 84 most distant from the instrument opening 72 is shaped to define a flat 88 in the otherwise cylindrically shaped walls of the outer section 84.

A slot 90 is formed in the holder to extend between opening 72 and the cavity 80 for permitting a trigger tip 172 of the valve assembly to protrude into the opening 72 as described more fully below. The slot 90 is formed through the bottom of the holder and terminates at a location near the junction of the lower surface 78 and upper surface 76 of the opening 72. The slot 90 has generally straight parallel sidewalls 92 that are contiguous with a top wall 94 (FIG. 6) that slopes downwardly in the direction toward the opening 72.

Figure 4:
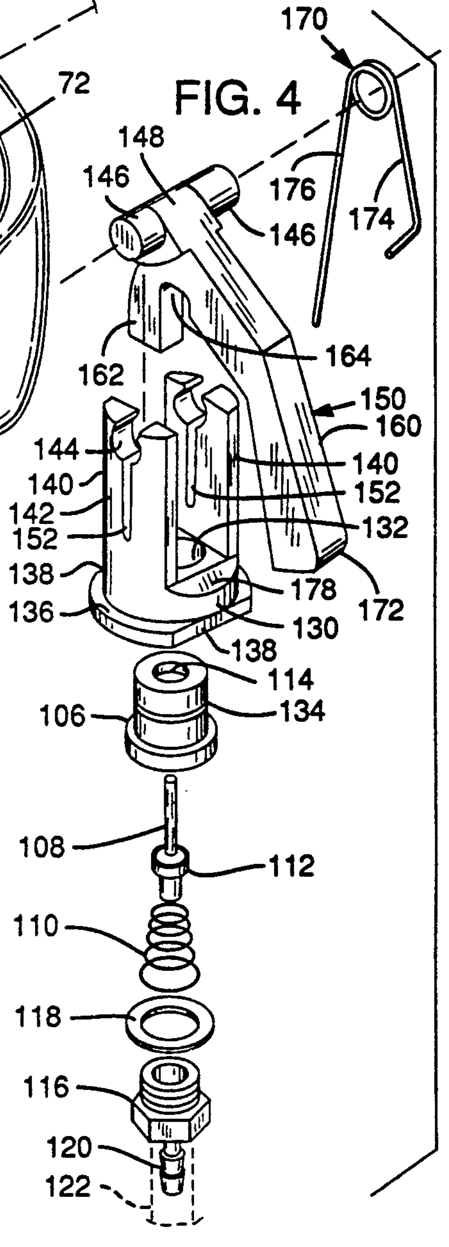
FIG. 4 is an exploded perspective view of the valve assembly.

The valve assembly 100 of the present invention may be installed within the cavity 80 of the instrument holder. With reference to FIGS. 3 and 4 the valve assembly includes a valve 102 secured to a trigger assembly 104. The valve 102 includes a hollow cylindrical body 106 that contains the base 112 of a valve stem 108. The stem 108 is forced by an internal spring 110 into coaxial alignment with the opening 114 so that the base 112 of the stem 108 normally occludes the opening 114 in the valve body. The valve body 106 is closed on the bottom by a nut 116 and washer 118. A connector 120 is fastened to the nut 116 and provides fluid communication between a pneumatic line 122 that is fit over the connector 120 and the interior of the valve body 106.

When the valve stem 108 is in its closed position shown in dashed lines in FIG. 6, the base 112 of the stem seals the opening 114 in the valve body so that no air bleeds from the connected pneumatic line 122. Whenever the stem 108 is tipped out of the closed position, such as shown in solid lines of FIG. 6, the base 112 of the valve stem shifts by an amount sufficient to let air bleed from the pneumatic line 122.

The trigger mechanism 104 includes a base 130 through which is formed a hole 132 into which hole tightly fits the body 106 of the valve 102. The bottom of the valve body 106 is flanged to abut the undersurface 137 of the base 130. Preferably, the interior of the hole 132 has inwardly protruding ribs that fit into a peripheral groove 134 formed in the valve body 106 when the body is pressed into the base 130. The base 130 of the trigger mechanism has a bottom flange 136 that includes opposing, parallel flats 138 formed therein. One of the flats 138 aligns with the flat 88 in the cavity outer section 84 to prohibit rotation of the valve assembly within the cavity when the trigger mechanism 104 is installed as described below.

A pair of spaced apart pivot brackets 140 extend upwardly from the base 130 of the trigger mechanism. Each bracket 140 has a curved outer surface 142 that is generally curved to match to the shape of the inner section 82 of the holder cavity 80. The upper portion of each pivot bracket 140 includes a rounded groove 144 into which groove snap-fits a cylindrical end 146 of a pivot post 148 that is integrally formed with the trigger 150 of the trigger mechanism. To this end, a slit 152 is formed to extend contiguously from each groove 144 through a portion of each bracket 140 so that the groove portion near the uppermost ends of the brackets 140 can enlarge slightly as ends 146 of the pivot post 148 are pressed into the grooves 144 during assembly of the trigger mechanism 104.

The trigger 150 includes an elongated arm 160 protruding from the center of the pivot posts 148 in a direction generally outwardly and downwardly from the post 148. At the junction of the arm 160 and pivot post 148, the trigger is shaped to define a downwardly protruding boss 162. A clearance space 164 is defined between the arm 160 and boss 162 into which space the stem 108 of the valve extends between the brackets.

A spring 170 is attached to the trigger 150 to normally urge the tip 172 of the arm outwardly, away from the valve 102. The spring 170 is coiled to fit over one of the cylindrical ends 146 of the pivot post 148. One leg 174 of the spring has a bent end that fits against the trigger arm 160. The other leg 176 of the spring bears against a sloped surface 178 formed in the base 130 between the lower portions of the brackets 140 When the valve assembly 100 is assembled (see FIG. 6) the spring legs 174, 176 are normally urged apart for forcing the arm 160 away from the base 130.

The valve assembly 100 is installed within the cavity 80 of the instrument holder so that the trigger arm 160 fits within slot 90 and so that the flat 138 in the base 130 that is opposite the trigger arm 160 fits against the flat 88 in the outer section 84 of the cavity. As shown in FIG. 5, a threaded aperture 180 is formed in the bottom surface 77 of the holder near the cavity 80. The aperture 180 includes a counter-bored part 182 that penetrates the holder to a depth in the holder about equal to the location of the undersurface 137 (FIG. 6) of the trigger mechanism base 130 when the valve assembly is installed. The threaded opening 180 is located so that the counter-bored portion 82 intersects the outer section 84 of the cavity and so that the head 189 of a fastener that is threaded into the opening 180 will protrude into the outer section of the cavity and bear against the base undersurface 137 to hold the assembly within the cavity.

With reference to FIG. 6, it will be appreciated that when there is no instrument present in the opening 72 of the holder, the trigger arm 160 protrudes as shown and the boss 162 is swung by the action of the spring 170 against the stem 108 to move the stem into the open position shown. The top wall 94 of the holder slot 90 acts as a stop to limit the outward extension of the trigger arm 160. Whenever an instrument is reinserted into the holder opening 72 as shown in dashed lines in FIG. 6, the arm 160 is pushed into the slot and, therefore, the boss 162 rotates away from the stem 108 so that the stem can resume the upright, closed position and fit within the clearance space 164 between the trigger arm 160 and the boss 162. In view of the foregoing, it will be appreciated that the instrument holder with the valve assembly as just described provides a very compact and easily assembled mechanism. The assembly 100 can be manufactured as essentially a self-contained unit that is easy to install into the holder.

Figure 7:
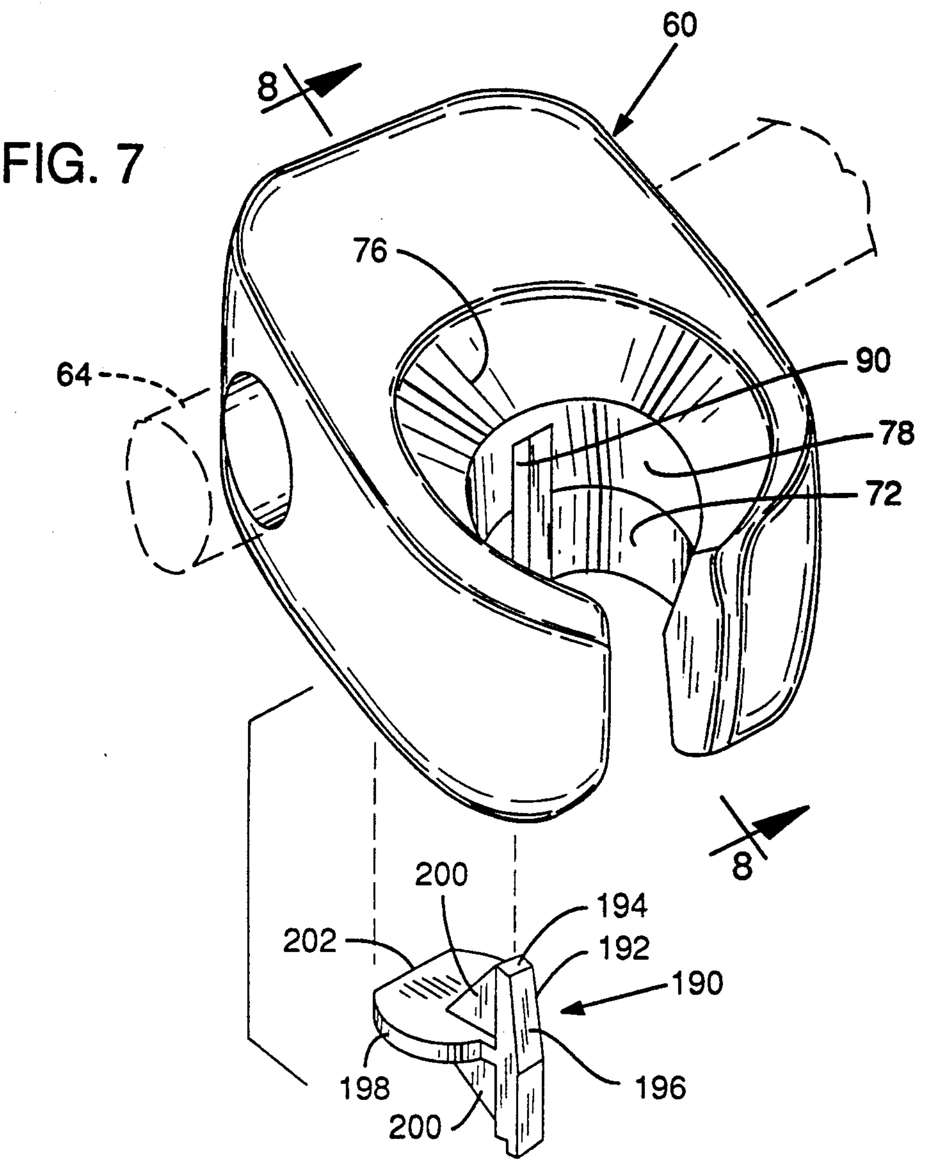
FIG. 7 is a perspective view of the holder showing a plug for sealing part of the instrument holder opening when a valve assembly is not installed in the holder.
Figure 8:
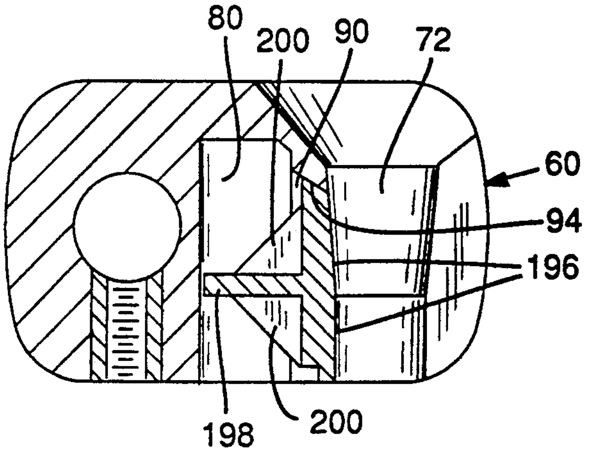
FIG. 8 is a cross sectional view taken along line 8—8 of FIG. 7 showing the plug in place within the holder.

With reference to FIGS. 7 and 8, it is noteworthy that, in some applications, a valve assembly may or not be installed in a holder, depending upon the dental instruments used. In accordance with the present invention, a plug 190 is provided for the purpose of closing the slot 90 between the internal cavity 80 of the holder and the opening 72 thereby making the holder easy to clean by preventing foreign matter from entering the cavity 80 through the slot.

The plug 190 generally comprises an elongated post 192 that fits snugly within the slot 90 between the sidewalls 92 of the slot. The post includes a top surface 194 that is inclined to fit against the top wall 94 of the slot 90. The outer surface 196 of the post is shaped to conform to the shape of the lower surface 78 of the opening 72. A generally horizontal (FIG. 8) mounting flange 198 protrudes from about the midpoint of the inner surface of the post 192. Gussets 200 are formed on each side of the flange 198 to support and stiffen the post 192 and flange 198. The flange 198 includes a flat 202 that conforms to the flat 88 in the holder cavity.

FIG. 8 shows the plug 190 installed in a holder 60. The edge of the upper surface of the flange 198 bears against the shoulder 86 (FIG. 5) formed in the cavity 80 and is held thereto a headed fastener threaded into the opening 180 in a manner such as that described with respect to the installation of the valve assembly 100.

Figure 9:
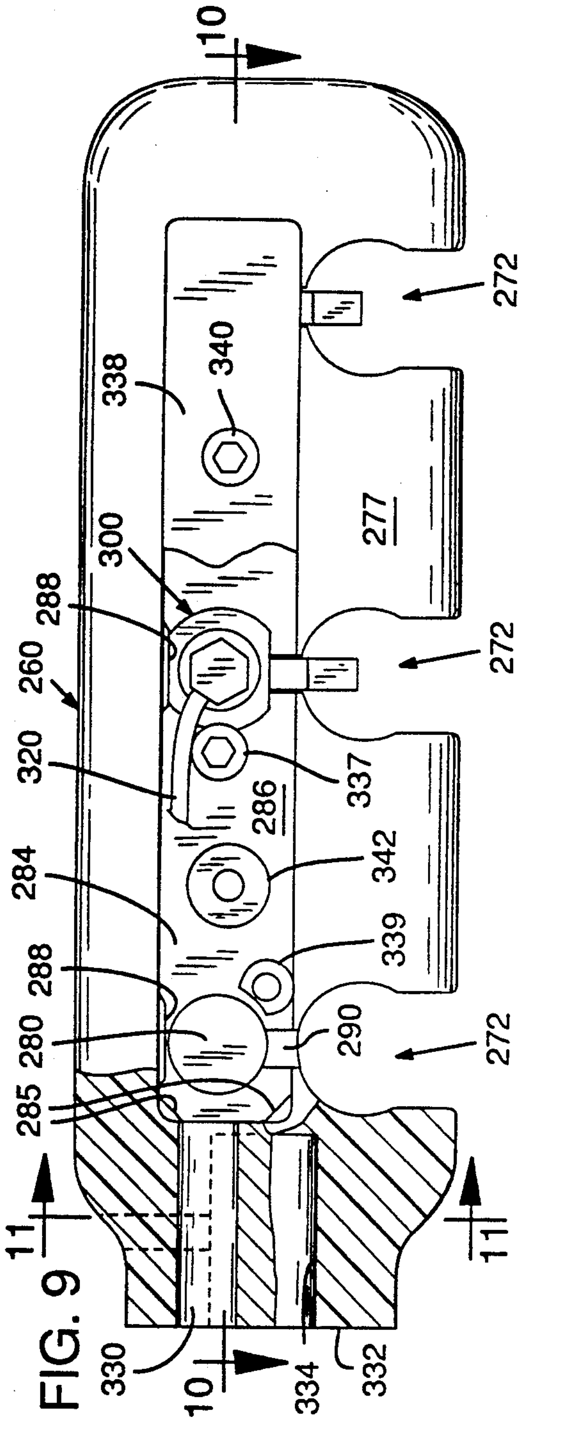
FIG. 9 is a bottom view of an alternative embodiment of an instrument holder, which embodiment can carry three valve assemblies.
Figure 10:
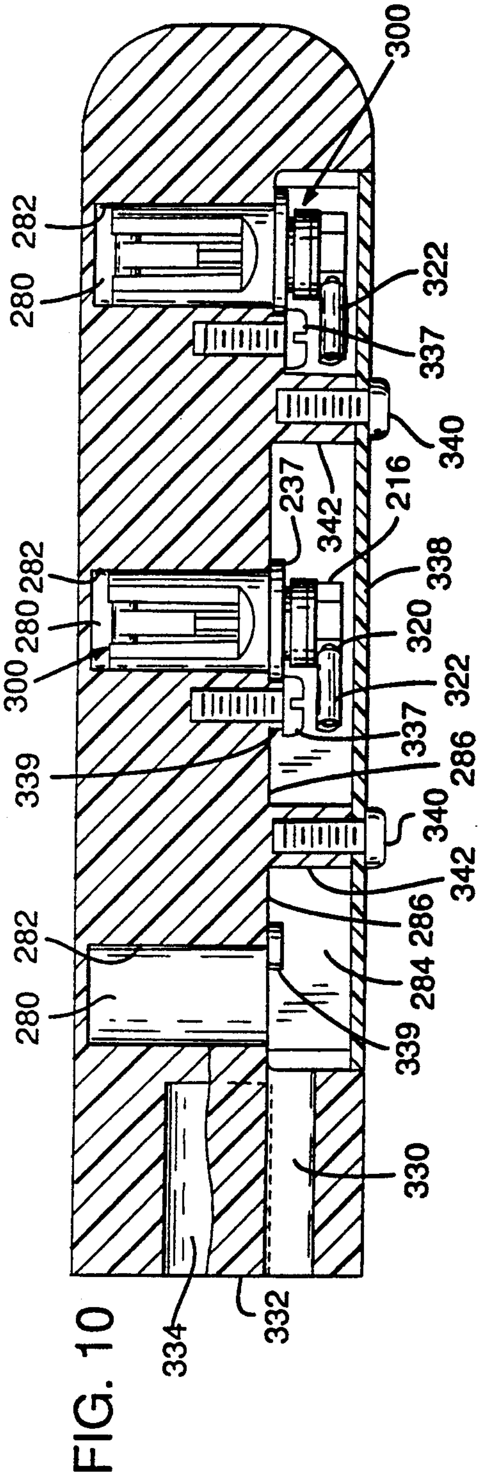
FIG. 10 is a cross sectional view of the alternative embodiment taken along line 10—10 of FIG. 9 and rotated 180°.
Figure 11:
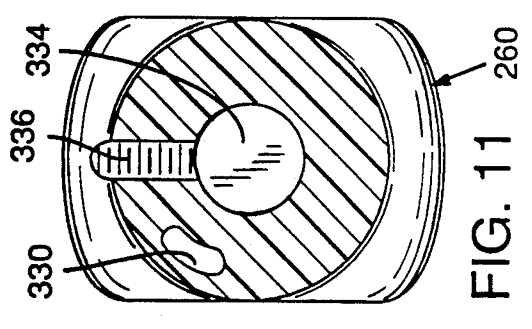
FIG. 11 is a cross sectional view of the alternative embodiment taken along line 11—11 of FIG. 9.

FIGS. 9-11 depict an alternative embodiment of an instrument holder formed in accordance with the present invention. The holder 260 is preferably an elongated molded part made, for example, from phenolic melamine. FIG. 9 is a bottom view of the holder, partly broken away. The alternative holder has three openings 272 shaped for the purpose of receiving and holding instruments in a manner as set forth with respect to the opening 72 of the first described embodiment. Adjacent to each opening 272, there is formed a cavity 280 having a generally cylindrical inner section 282 that matches the shape and function of the inner section 82 of the cavity 80 of the first described embodiment. A slot 290 extends between each cavity 280 and the adjacent opening 272 for permitting the trigger of a valve assembly 300 to protrude into the opening 272.

The outer section of the cavities 280 are substantially defined by an elongated trench 284 formed in the holder bottom surface 277 to extend along the portion of the length of the holder 260 that has openings 272 formed in it. (It will be appreciated that a holder 260 could be formed with fewer or more openings 272 for holding instruments). The portions of the horizontal surface 286 (FIG. 10) of the trench 284 surrounding the cavities 280 define the shoulder against which the flanged base of the valve assembly 300 abuts when a valve assembly is installed into a cavity 280. The valve assemblies 300 are held in place by fasteners that are threaded into the holder 260 near the cavities 280 so that the heads 337 of the fasteners clamp the flanges 136 to the surface 286 of the trench 284. Preferably, the annular portion 339 of the trench bottom surface 286 beneath each fastener head 337 is raised by an amount corresponding to the thickness of the flange of the valve assemblies, thereby to permit the fastener heads to bear evenly upon the base undersurface 237.

The portion of the trench vertical wall (FIG. 9) most distant from the instrument opening 272 is shaped to define a flat 288 located immediately adjacent to each cavity 280 to function as the flat 88 described in connection with the first embodiment.

It is noteworthy here that the valve assembly 300 depicted in FIGS. 9-11 is substantially identical to the valve assembly 100 described above except for the provision of a connector 320 that protrudes from the side of the nut 216 of the assembly, instead of from the bottom of the nut 116 of the earlier described embodiment. The sideways extension of the connector 320 facilitates enclosing the associated pneumatic tubing 322 within the trench 284. In this regard, pneumatic tubing 322 associated with each valve assembly (one of the cavities 280 is shown without an installed assembly 300 for the purpose of illustration) is directed to the inner most end of the trench 284 (that is, the left end in FIG. 9). That end is contiguous with a passage 330 formed between the trench 284 and the inner surface 332 of the holder. The pneumatic tubing 320 fits through the passage 330 and is directed to the control system (not shown).

A preferred method of mounting the holder 260 is to fit a cylindrical central opening 334 in the holder over a corresponding shaped protruding rod (not shown) and to secure the holder 260 to the rod with a set screw threaded into a threaded aperture 336 formed in the holder to intersect the central opening 334.

Once the valve assemblies 300 are installed (or, for example, a plug such as shown at 190, FIG. 7 is installed instead of a valve) the trench 284 is enclosed with a cover plate 338. The cover plate is held to the holder by fasteners 340 that thread into mounting posts 342 that extend from the trench surface 286 to provide support for the plate 338. Moreover, the trench 284 is formed with recessed supports 285 in each corner against which supports the corners of the cover plate 338 rest when the plate is fastened to the holder.

While the foregoing invention has been described in connection with preferred and alternative embodiments, it will be appreciated by one of ordinary skill in the art the various modifications and substitutions to those embodiments can be made without departure from the spirit and scope of the invention as recited in the appended claims.

The invention claimed is:

1. An instrument holder, comprising:

a holder having finger portions shaped to define an opening into which a dental instrument can fit to be hung from the holder;

a trigger assembly connectable to the holder and including:

a base having a hole formed therein;

a pair of brackets attached to the base;

a trigger member pivotally mounted to the brackets and having a connected arm and a boss;

a valve secured within the hole in the holder and connectable to a source of pressurized air, the valve having a stem that is movable between an open position for opening the valve and a closed position for closing the valve; and spring means for urging the trigger member toward a first position wherein the boss holds the stem in the open position.

2. The instrument holder of claim 1 wherein the holder includes a cavity formed therein into which the trigger assembly fits for connection to the holder, and a fastener threaded into the holder for connecting the trigger assembly to the holder, the trigger assembly being removable from the cavity upon removal of the fastener.

3. The holder of claim 1 wherein the brackets are grooved to permit the trigger member to be mounted to the brackets by snap-fitting the trigger member into the grooves.

4. The holder of claim 1 wherein the spring means is a spring carried on the trigger member.

5. An instrument holder, comprising a holder member having a top and a bottom, the holder member having an opening formed therein for receiving a dental instrument adjacent to the opening, and a slot formed through the bottom of the holder member to be contiguous with and connecting the opening and the cavity.

6. The holder of claim 5 including a second opening formed therein for receiving a dental instrument and a second cylindrical cavity formed therein through the bottom adjacent to the second opening, and a second slot contiguous with and connecting the second opening and the second cavity, the holder member also including a trench formed in the bottom thereof and contiguous with the first-mentioned and second cavities.

7. The holder of claim 5 further including a plug attachable to the holder member and having a part that fits within the slot for plugging the slot.

8. A valve assembly that is connectable to a dental instrument holder, comprising a trigger assembly including:

a base having a hole formed therein;

a pair of brackets attached to the base;

a trigger member pivotally mounted to the brackets and having a connected arm and a boss;

a valve secured within the hole in the base and connectable to a conduit of pressurized air, the valve having a stem projecting from the top of the valve and movable between an open position for opening the valve and a closed position for closing the valve; and spring means for urging the trigger member toward a first position wherein the boss holds the stem in the open position.

9. The valve assembly of claim 8 wherein the valve includes a connector attached thereto for connecting an elongated conduit to a side of the valve.

10. The valve assembly of claim 8 wherein the hole in the base is located so that the stem of the valve projects between the two brackets to which the trigger member is mounted.

* * * * *

UNITED STATES PATENT AND TRADEMARK OFFICE

CERTIFICATE OF CORRECTION

PATENT NO. : 5,273,427

DATED : December 28, 1993

INVENTOR(S) : George K. Austin Jr. et al.

It is certified that error appears in the above-identified patent and that said Letters Patent is hereby corrected as shown below:

Column 4, line 51 "140 When" should read --140. When--

Column 7, line 32, "instrument adjacent" should read --instrument and a cylindrical cavity formed therein through the bottom adjacent--

Signed and Sealed this

Twentieth Day of September, 1994

Attest:

Bruce Lehman

BRUCE LEHMAN

*Attesting Officer* *Commissioner of Patents and Trademarks*